(12) United States Patent
Rink et al.

(10) Patent No.: US 6,221,186 B1
(45) Date of Patent: Apr. 24, 2001

(54) SELF-COMPENSATING AIRBAG INFLATOR AND METHOD

(75) Inventors: Karl K. Rink; Linda M. Rink, both of Liberty, UT (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 09/276,942

(22) Filed: Mar. 26, 1999

Related U.S. Application Data

(63) Continuation-in-part of application No. 08/935,014, filed on Sep. 22, 1997, now Pat. No. 5,941,562, which is a continuation-in-part of application No. 08/632,698, filed on Apr. 15, 1996, now Pat. No. 5,669,629.

(51) Int. Cl.[7] .......................... C06B 47/00; C06B 47/04; B60R 21/26; B60R 21/28
(52) U.S. Cl. .................. 149/1; 149/74; 280/737; 280/740; 280/741; 280/742
(58) Field of Search .................. 280/740, 742, 280/737; 149/1, 74

(56) References Cited

U.S. PATENT DOCUMENTS

| | | | |
|---|---|---|---|
| 5,428,988 | * 7/1995 | Starkovich | 280/741 |
| 5,466,313 | * 11/1995 | Brede et al. | 149/1 |
| 5,470,104 | 11/1995 | Smith et al. | 280/737 |
| 5,494,312 | 2/1996 | Rink | 280/737 |
| 5,531,473 | 7/1996 | Rink et al. | 280/737 |
| 5,536,339 | 7/1996 | Verneker | 149/19.5 |
| 5,582,428 | * 12/1996 | Buchanan et al. | 280/741 |
| 5,630,619 | * 5/1997 | Buchanan et al. | 280/741 |
| 5,649,720 | * 7/1997 | Rink et al. | 280/737 |
| 5,669,629 | 9/1997 | Rink | 280/741 |
| 5,713,595 | 2/1998 | Mooney et al. | 280/736 |
| 5,803,492 | 9/1998 | Rink et al. | 28/737 |
| 5,836,610 | 11/1998 | Rink et al. | 280/736 |
| 5,884,938 | 3/1999 | Rink et al. | 280/741 |
| 5,941,562 | * 8/1999 | Rink et al. | 280/737 |
| 5,964,479 | * 10/1999 | Rink et al. | 280/741 |

* cited by examiner

Primary Examiner—Michael J. Carone
Assistant Examiner—Glenda L. Sánchez
(74) Attorney, Agent, or Firm—Pauley Petersen Kinne & Fejer

(57) ABSTRACT

An inflator apparatus and a method are provided using a quantity of a compensatory material to supplement a stored pressurized gas.

18 Claims, 6 Drawing Sheets

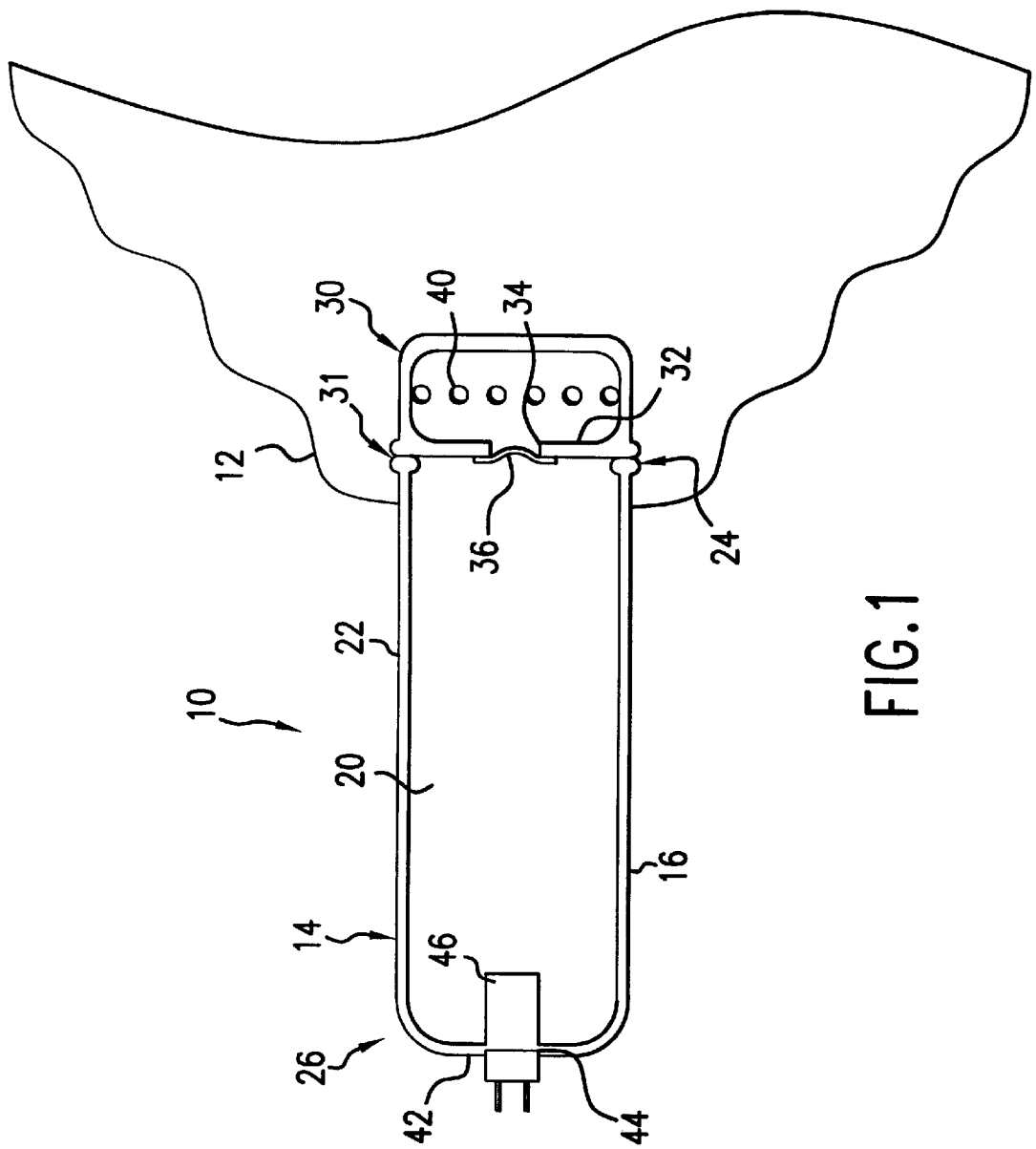

SELF-COMPENSATING AIRBAG INFLATOR AND METHOD

CROSS REFERENCE TO RELATED APPLICATIONS

This application is a continuation-in-part of copending application Ser. No. 08/935,014, filed on Sep. 22, 1997, now U.S. Pat. No. 5,941,562, issued Aug. 24, 1999, which in turn is a continuation-in-part of application Ser. No. 08/632,698, filed on Apr. 15, 1996, now Rink, U.S. Pat. No. 5,669,629, issued Sep. 23, 1997. Further, the subject matter of this application is related to prior U.S. patent applications Ser. No. 09/112,838, filed on Jul. 10, 1998; Ser. No. 09/005,274, filed on Jan. 9, 1998; Ser. No. 08/935,014, filed on Sep. 22, 1997; and Serial No. 08/632,698, filed on Apr. 15, 1996, now Rink, U.S. Pat. No. 5,669,629, issued Sep. 23, 1997. The disclosure of each of these prior patent applications is hereby incorporated by reference herein and made a part hereof, including but not limited to those portions which specifically appear hereinafter.

BACKGROUND OF THE INVENTION

This invention relates generally to an apparatus, commonly referred to as an inflator, for use in inflating an inflatable device such as an inflatable vehicle occupant restraint of a respective inflatable restraint system. More specifically, the invention relates to relates to such inflation devices and related methods which utilize or rely at least in part on a pressurized fluid such as a compressed gas. In particular, the invention relates to such devices and related methods which self-compensate, at least in part, for certain design requirements associated with one or more of the manufacture, production, storage and long-term use of such a device.

It is well known to protect a vehicle occupant using a cushion or bag, e.g., an "airbag cushion," that is inflated or expanded with gas when the vehicle encounters sudden deceleration, such as in the event of a collision. In such systems, an airbag cushion is normally housed in an uninflated and folded condition to minimize space requirements. Upon actuation of the system, the cushion begins to be inflated, in a matter of no more than a few milliseconds, with gas produced or supplied by a device commonly referred to as an "inflator."

Many types of inflator devices have been disclosed in the art for inflating an inflatable restraint system airbag cushion. One category of such inflator devices is often referred to as "compressed gas inflators" and generally refers to various inflator devices which contain compressed gas.

As is known, one particular type of compressed gas inflator, commonly referred to as a "stored gas inflator," simply contains a quantity of a stored compressed gas which is selectively released to inflate an associated airbag cushion.

Another known type of compressed gas inflator is commonly referred to as a "hybrid" inflator. In such an inflator device, inflation gas results from a combination of stored compressed gas and the combustion of a gas generating material, e.g., a pyrotechnic. Hybrid inflators that have been proposed heretofore have been subject to certain disadvantages. For example, such inflators commonly result in the production of a gas having a relatively high particulate content. The removal of such solid particulate material, such as by the incorporation of various filtering devices within or about-he inflator, undesirably increases the complexity of the inflator design and processing and can increase the costs associated therewith.

In view of these and other related or similar problems and shortcomings of prior inflator devices, a new type an inflator, called a "fluid fueled inflator," has been developed. Such inflators are the subject of commonly assigned Smith et al., U.S. Pat. No. 5,470,104, issued Nov. 28, 1995; Rink, U.S. Pat. No. 5,494,312, issued Feb. 27, 1996; Rink et al., U.S. Pat. No. 5,531,473, issued Jul. 2, 1996, Rink et al., U.S. Pat. No. 5,803,492 issued Sep. 8, 1998 and Rink et al., U.S. Pat, No. 5,836,610, issued Nov. 17, 1998, the disclosures of which are fully incorporated herein by reference.

Such inflator devices typically utilize a fuel material in the form of a fluid, e.g., in the form of a gas, liquid, finely divided solid, or one or more combinations thereof, in the formation of an inflation gas for an airbag cushion. One form of the fluid fuel inflator utilizes a compressed gas. In one such inflator device, the fluid fuel material is burned to produce gas which contacts a quantity of stored pressurized gas to produce inflation gas for use in inflating a respective inflatable device.

Beyond the simple functioning of an inflator and deployment of the associated airbag cushion, proper operation of and performance by an inflatable restraint system generally requires that the inflator operate and the airbag cushion deploy in a proper and desired manner. While proper inflator operation can be variously defined, ultimately an inflator and the associated airbag cushion need provide adequate vehicle occupant protection over an extended period of time (typically 15 years or more) after original construction of the vehicle. For example, one common technique by which the performance of an inflator device may be evaluated involves the monitoring of the pressure achieved upon discharge of the inflator device into a closed tank of known volume, sometimes referred to as the "tank pressure." In using such performance evaluation technique, it is commonly desired that after a service life of about 15 years or more, an airbag inflator device be able to produce or achieve a tank pressure of at least about 90% of the tank pressure value obtainable when the inflator device was in an original or new condition or state.

The satisfaction of such inflator performance criterion generally requires or necessitates that an inflator device associated with a particular airbag cushion satisfy at least certain design requirements. For example, compressed gas inflators commonly require the presence of at least a certain specified quantity of the compressed gas material in order for the inflator to perform in the designed-for manner. The quantity or amount of stored compressed material in an inflator is generally at least a function of the quantity or amount of the material originally placed within the inflator device or a specific chamber thereof (sometimes referred to as the "load" or "fill") as well as the ability of the inflator device or specific chamber thereof to contain or maintain a selected quantity or amount of the stored compressed material therein (sometimes referred to in term of the "leak rate" therefrom). In practice, it is common to speak of such leak rate and load design parameters in terms of acceptable or desirable corresponding tolerances.

As will be appreciated, the ability of an inflator device to withstand or tolerate a greater or higher leak rate is generally desirable from a manufacturing perspective. For example, measurement and monitoring of lower or lesser leak rates generally requires the use of more sensitive and typically more expensive measurement equipment and techniques.

In the manufacture or production of compressed gas inflator, the load or fill tolerance of compressed gas is commonly one of the most difficult requirements to be satisfied. In practice, compressed gas inflators and, more particularly, the pressure chambers thereof, are typically designed for a selected or maximum storage pressure. As will be appreciated, greater or larger storage pressures generally necessitate that the walls of the gas storage chambers of such inflators be relatively thicker for increased strength. The combination of large volume and thick walls may result in an inflator design of greater than desired weight and/or bulk.

Moreover, load and leak rate tolerances are commonly or frequently interrelated. For example, the need to provide a sufficient leak rate tolerance to facilitate leak rate measurement and monitoring may severely limit or restrict the range of acceptable load variation or tolerance. As will be appreciated, precise compressed gas loading can be difficult and costly to achieve.

Thus, there is a need and a demand for a compressed gas-containing inflator design and associated methods which minimize, reduce or avoid the criticality of at least one or more design parameter associated therewith, such as relating to the load tolerance, the leak rate tolerance and combinations thereof for a particular inflator device.

SUMMARY OF THE INVENTION

A general object of the invention is to provide an improved apparatus for inflating an inflatable device and an improved compressed gas-containing inflator device.

A more specific objective of the invention is to overcome one or more of the problems described above.

The general object of the invention can be attained, at least in part, through, in an inflator device having a chamber containing a quantity of a compressed gas and a heat source actuatable to be in heat transmitting communication with the contents of the chamber, a method for improving at least one inflator device design parameter selected from the group consisting of load tolerance, leak rate tolerance and combinations thereof. In accordance with such method, a quantity of a compensatory material of a first molar content and which compensatory material, when initiated, undergoes dissociation to form dissociation products having a second molar content, where the second molar content is greater than the first molar content, is added to the chamber.

The prior art generally fails to provide compressed gas-containing inflator design and associated methods, which minimize, reduce or avoid the criticality of at least one or more design parameter associated therewith, such as relating to the load tolerance, the leak rate tolerance and combinations thereof for a particular inflator device in an as simple, effective and economical a manner as may be desired.

The invention further comprehends an apparatus for inflating an inflatable device. The apparatus includes a first chamber having contents including a stored pressurized gas and at least about 5 mole percent to no more than about 95 mole percent of a compensatory material of a first molar content. The apparatus also includes a heat source actuatable to be in heat transmitting communication with the contents of the first chamber to heat the contents and to initiate dissociation of at least a portion of the compensatory material. Upon dissociation, the compensatory material forms dissociation products having a second molar content, where the second molar content is greater than the first molar content.

As used herein, references to "dissociation," "dissociation reactions" and the like are to be understood to refer to the dissociation, splitting, decomposition or fragmentation of a single molecular species into two or more entities.

"Thermal dissociation" is a dissociation controlled primarily by temperature. It will be appreciated that while pressure may, in a complex manner, also influence a thermal dissociation such as perhaps by changing the threshold temperature required for the dissociation reaction to initiate or, for example, at a higher operating pressure change the energy which may be required for the dissociation reaction to be completed, such dissociation reactions remain primarily temperature controlled.

An "exothermic thermal dissociation" is a thermal dissociation which liberates heat.

"Equivalence ratio" ($\Phi$) is an expression commonly used in reference to combustion and combustion-related processes. Equivalence ratio is defined as the ratio of the actual fuel to oxidant ratio $(F/O)_A$ divided by the stoichiometric fuel to oxidant ratio $(F/O)_S$:

$$\Phi = (F/O)_A / (F/O)_S \qquad (1)$$

(A stoichiometric reaction is a unique reaction defined as one in which all the reactants are consumed and converted to products in their most stable form. For example, in the combustion of a hydrocarbon fuel with oxygen, a stoichiometric reaction is one in which the reactants are entirely consumed and converted to products entirely constituting carbon dioxide ($CO_2$) and water vapor ($H_2O$). Conversely, a reaction involving identical reactants is not stoichiometric if any carbon monoxide (CO) is present in the products because CO may react with $O_2$ to form $CO_2$, which is considered a more stable product than CO.)

For given temperature and pressure conditions, fuel and oxidant mixtures are flammable over only a specific range of equivalence ratios. Mixtures with an equivalence ratio of less than 0.25 are herein considered nonflammable, with the associated reaction being a decomposition reaction or, more specifically, a dissociative reaction, as opposed to a combustion reaction.

A "pyrotechnic" material, in its simplest form, consists of an oxidizing agent and a fuel that produce an exothermic, self-sustaining reaction when heated to the ignition temperature thereof.

Other objects and advantages will be apparent to those skilled in the art from the following detailed description taken in conjunction with the appended claims and drawings.

BRIEF DESCRIPTION OF THE DRAWINGS

FIG. 1 is a simplified, partially in section, fragmentary schematic drawing of a vehicle occupant safety apparatus incorporating an airbag inflator assembly in accordance with one embodiment of the invention.

DETAILED DESCRIPTION OF THE INVENTION

Figure 2A:
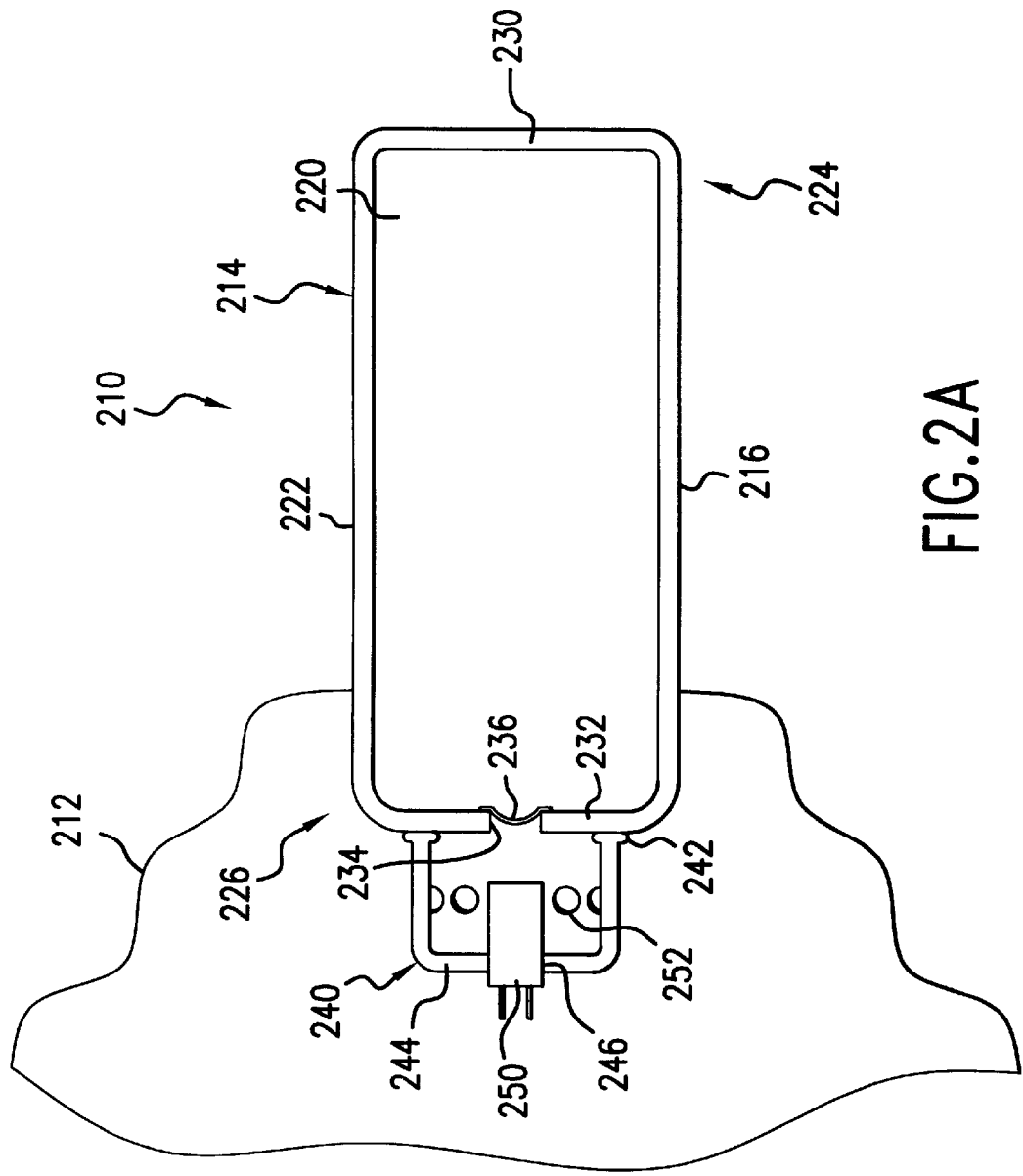
FIGS. 2A and 2B are simplified, partially in section, fragmentary schematic drawings of a vehicle occupant safety apparatus incorporating an airbag inflator assembly in accordance with another preferred embodiment of the invention in a static state and a dynamic state, respectively.

The present invention generally relates to devices containing pressurized fluid such as inflator devices used in the inflation of an inflatable article such as an inflatable vehicle occupant restraint airbag cushion used in inflatable restraint systems. In particular, the invention relates to such a compressed gas-containing device and related methods which self-compensate, at least in part, for certain design requirements associated with one or more of the manufacture, production, storage and long-term use of such a device.

As will be appreciated, the present invention may be embodied in a variety of different structures. Referring initially to FIG. 1, there is illustrated the present invention as embodied in a vehicle occupant safety assembly, generally designated by the reference numeral 10. The vehicle occupant safety assembly 10 includes an inflatable vehicle occupant restraint 12, e.g., an inflatable airbag cushion, and an apparatus, generally designated by the reference numeral 14, for inflating the occupant restraint. Such an apparatus is commonly referred to as an inflator.

As is known upon proper actuation, such inflatable vehicle occupant restraints are typically inflated by a flow of an inflation fluid, e.g., gas, from an inflator assembly to restrain movement of an occupant of the vehicle. In practice, it is common that inflatable vehicle occupant restraints be designed to inflate into a location within the vehicle between the occupant and certain parts of the vehicle interior, such as a door, steering wheel, instrument panel or the like, to prevent or avoid the occupant from forcibly striking such parts of the vehicle interior.

The invention is described hereinafter with particular reference to an inflator for use in various automotive vehicles including vans, pick-up trucks, and particularly automobiles. As will be appreciated by those skilled in the art, the invention has applicability to various types or kinds of airbag installations for automotive vehicles including driver side, passenger side and side impact airbag assemblies, for example. Moreover, the invention has applicability with other types of vehicles as well, including airplanes, for example.

The inflator 14 comprises a pressure vessel 16 including a chamber 20. The chamber 20 is defined in part by an elongated generally cylindrical sleeve 22. The sleeve 22 may include a fill port (not shown), as is known in the art, wherethrough materials can be passed into the chamber 20.

In the static state, the chamber 20 contains, such as is known for stored gas compressed gas inflators, a compressed, typically inert gas and, in accordance with the invention and as described in greater detail below, a quantity of a compensatory material. It is to be understood that the contents of chamber 20, while generally present primarily in a gaseous phase, may at least in part be present in a liquid phase, dependent on the selected or realized storage conditions.

It will be appreciated that inert gases useable in the invention include noble gases such as argon and helium, for example, as well as materials such as nitrogen and carbon dioxide which are essentially inert under such processing conditions. In addition, the stored gas chamber may contain a quantity of gaseous helium to facilitate leak checking of the chamber such as in a manner well known in the art.

Further, additionally or alternatively and as disclosed in commonly assigned, pending patent application U.S. Ser. No. 08/935,016, filed on Sep. 22, 1997, the chamber 20 may include a quantity of at least one radioactive isotope leak trace material whereby fluid leakage from the chamber can be detected, as disclosed in that prior patent application.

The sleeve 22 has a first end 24 and a second end 26. The first end 24 is closed by means of a diffuser assembly 30. Such a diffuser assembly 30 can be joined or attached to the sleeve 22 in an appropriate manner, such as by an inertial weld 31 or, if desired or preferred, be integral (i.e., formed continuous with and in one piece) with the sleeve 22.

The diffuser assembly 30 includes a rupturable base wall 32. In FIG. 1, the rupturable base wall 32 includes an opening 34 normally closed by means of a burst disc 36 or the like. It will be appreciated that other forms of a rupturable wall such as a wall having an appropriately scored surface or thinned region, for example, can, if desired, be used. The diffuser assembly 30 also includes a plurality of outlet openings 40, wherethrough the inflation gas from the inflator assembly 14 is properly dispensed into the occupant restraint 12. Thus, the diffuser assembly 30 can serve to facilitate direction of the inflation fluid from the inflator assembly 14 into the associated inflatable vehicle occupant restraint 12.

The sleeve second end 26 is partially closed by a base wall 42. The base wall 42 includes an opening 44 therein, wherethrough a heat source 46, such as described in greater detail below, is attached in sealing relation within the chamber 20. As will be appreciated, such attachment can be effected by various appropriate means such as with a weld, crimp or other suitable hermetic seal, for example.

The heat source 46 is actuatable to be in heat transmitting communication with the contents of the chamber 20 to initiate dissociation of the at least one compensatory material stored therewithin. As will be appreciated, the heat source 46 additionally serves to heat the compressed gas stored within the chamber 20.

In such an assembly, the heat source may include a suitable initiator device and may, if desired, optionally contain a desired load of a pyrotechnic initiator charge. Suitable initiator devices may take various forms or be of various types including: bridgewire, spark-discharge, heated or exploding wire or foil, through bulkhead (e.g., an initiator which discharges through a bulkhead such as in the form of a metal hermetic seal), for example.

In practice, a relatively large heat input such as from the initiator, may be helpful in obtaining a more thorough initiation of the dissociation of various compensatory materials. In view thereof, as pyrotechnic charge-containing initiators can typically more easily produce, such relatively large heat inputs from a relatively small sized heat source device, the practice of the invention with such initiators can be particularly advantageous.

The above-identified Rink, U.S. Pat, No. 5,669,629, discloses various gas source materials which, under specified conditions, undergo reaction variously termed decomposition or dissociation reaction to form products including, for example, heat and additional gaseous products and as may be used to inflate an associated vehicle occupant restraint. A preferred compensatory material for use in the practice of the invention desirably normally has a first molar content and, when initiated, such compensatory material undergoes dissociation to form dissociation products having a second molar content, where the second molar content is greater than the first molar content. Such compensatory materials, as disclosed in the above-identified Rink, U.S. Pat. No. 5,669,629, include:

acetylene(s) and acetylene-based materials such as acetylene and methyl acetylene, as well as mixtures of such acetylene(s) and acetylene-based materials with inert gas(es);

hydrazines such as hydrazine ($N_2H_4$), mixtures of hydrazine(s) and water, methyl derivatives of hydrazine, as well as mixtures of such hydrazine materials with inert gas(es);

peroxides and peroxide derivatives such as methyl hyperoxide ($CH_3OOH$) and mixtures of methyl hyperoxide and methanol, hydrogen peroxide, alkyl hydroperoxides, propionyl and butyryl peroxides, as well as mixtures of such peroxides and peroxide derivatives with inert gas(es); and nitrous oxide ($N_2O$) and mixtures of nitrous oxide with inert gas(es), for example.

Generally, dissociative compensatory materials used in the practice of the invention are preferably:

a.) non-toxic and non-corrosive both in the pre- and post-dissociation states;

b.) relatively stable at atmospheric conditions thus permitting and facilitating storage in a liquid phase, where a liquid, as compared to a gas, permits the storage of a greater amount of material in the same volume at a given pressure;

c.) do not require the presence of catalyst(s) to trigger the dissociation reaction, and which catalysts may be difficult to remove or handle; and d.) form products of dissociation which do not contain undesirable levels of undesirable species, such as carbonaceous material (e.g., soot), $CO_x$ and $NO_x$ (where x=1 or 2), and $NH_3$, for example.

A currently preferred dissociative compensatory material for use in the practice of the invention is nitrous oxide ($N_2O$). Nitrous oxide is advantageously generally non-toxic and non-corrosive. Further, nitrous oxide, as compared to gases such as air, nitrogen and argon, liquefies relatively easily at ambient temperatures. Additionally, nitrous oxide is relatively inert up to temperatures of about 200° C. or more. As a result, nitrous oxide is desirably relatively safe to handle, thermally stable, facilitates storage, and alleviates manufacturing concerns. Further, in accordance with the chemical reaction (2) identified below, upon the exothermic dissociation of nitrous oxide, the dissociation products ideally are nitrogen and oxygen:

$$2N_2O = 2N_2 + O_2 \quad (2)$$

Thus, not only does such reaction form products which are generally non-toxic and non-corrosive but also results in the production or formation of molecular oxygen, such as may be desired with certain inflator designs.

It is to be understood that such nitrous oxide can be, for example, stored in a gaseous, liquid or multi-phase form (i.e., partially gaseous and partially liquid mixture), as may be desired. The common premium in modern vehicle design placed on minimizing the size requirements for vehicular components such as inflatable restraint systems generally results in a preference for smaller sized airbag inflators. In view thereof and the fact that the density of nitrous oxide is significantly greater when in liquid, rather than gaseous form, one preferred embodiment of the invention involves storage of nitrous oxide primarily in a liquid form.

The inclusion of a dissociative compensatory material in accordance with the invention can beneficially enhance inflator and corresponding vehicle occupant safety assembly reliability as well as facilitate inflator manufacture and thus reduce the cost of production thereof. As will be appreciated and described in greater detail below, the compressed gas storage chamber inclusion of a dissociative compensatory material in accordance with the invention permits either or both a wider range of leak tolerance and a greater range of load tolerance as compared to a similar chamber free of such compensatory material.

To provide additional guidance to those skilled in the art, suitable concentrations or relative amounts of the preferred dissociative compensatory material nitrous oxide in the practice of the invention are discussed and described below. As will be appreciated, the quantity or relative amount of dissociative compensatory material selected for inclusion within such inflator chamber in accordance with the invention will generally be dependent on various factors including, for example, the reactivity and molar output of such dissociative material.

More specifically, the dissociative compensatory material nitrous oxide in accordance with the invention is advantageously generally used in concentration of about 5 mole percent to about 95 mole percent, preferably in a concentration of about 10 mole percent to about 90 mole percent and, more preferably, in a concentration of about 20 mole percent to about 70 mole percent.

The maximum relative concentration of dissociative compensatory material for use in the practice of the invention is generally limited by the need for the pressurized chamber to incorporate sufficient helium material to permit and facilitate necessary or desired leak checking of the chamber contents. While the relative amount of a leak check material such as helium may vary dependent upon the specific inflator design, generally at least about 5 mole percent helium is necessary in most (e.g., side, driver or passenger) compressed gas inflator systems. In view thereof, a maximum concentration of the dissociative compensatory material such as nitrous oxide is generally limited to no more than about 95 mole percent of the chamber contents. As will be appreciated, the use or development of other techniques or means of leak checking such pressurized chamber contents may not necessarily be so limited.

In accordance with certain preferred embodiments of the invention, it is believed advantageous to limit or reduce the maximum concentration of dissociative compensatory material, e.g., nitrous oxide, to no more than about 90 mole percent. For example, for systems relying on helium-based leak detection, the inclusion of helium in a greater relative amount and, in turn, the inclusion of nitrous oxide in a lesser relative amount, may provide a desirably greater margin of safety. In addition, the use of relative high amounts or concentrations of nitrous oxide, e.g., nitrous oxide in a relative amount of greater than about 90 mole percent, particularly in relative amounts of about 95 mole percent or more can raise special concerns or issues in at least some manufacturing environments, e.g., such as some welding environments.

Further, it has been discovered that limiting the maximum concentration of dissociative compensatory material, e.g., nitrous oxide, to no more than about 70 mole percent may be desired in at least certain preferred embodiments of the invention. For example, the use of nitrous oxide in concentrations of greater than about 70 mole percent may increase the propensity of such systems to form or produce undesirable oxides of nitrogen. Further, the use of nitrous oxide in high concentrations, e.g., in excess of 70 mole percent, generally necessitates the employment of relative high internal storage pressures and thus the use of relatively thick-walled chambers for increased strength. Such thick-walled inflators in turn may generally be bulkier and heavier than would otherwise be desired.

The minimum concentration of dissociative compensatory material for use in the practice of the invention can generally be established by the concentration of such material desired or required to overcome performance variability (e.g., such as measured or corresponding to variations in closed tank maximum pressures producible thereby) inherent with particular compressed gas inflators. In view thereof, a minimum concentration of at least about 5 mole percent of nitrous oxide is preferred as being generally sufficient to liberate sufficient dissociative products, e.g., heat and additional gaseous products, to increase the performance of an associated inflator device in a statistically significant manner even in view of design-permitted performance variation for a particular inflator design. It will be understood that in normal practice, such design-permitted performance variation may vary dependent on the particular type and design of inflator device used.

Further, a higher minimum concentration of dissociative compensatory material of at least about 10 mole percent or more may be useful and desired such as to permit the release or liberation of a greater amount of heat upon the exothermic dissociation of the load of such material such as to more readily permit the overcoming of possible or anticipated inflator performance variations such as due to low compressed gas loads. While such a higher minimum concentration is believed adequate for at least most inflation systems, it will be appreciated that such values can be appropriately varied and set in response to particular applicable inflator design and processing variations.

In accordance with certain preferred embodiments of the invention, a minimum concentration of dissociative compensatory material, e.g., nitrous oxide, of at least about 20 mole percent or more is believed desirable. Such higher minimum amount may more readily permit such resulting inflator system to overcome:

a) anticipated or design-permitted variations in performance between particular similarly-designed inflators,
  b) performance variations and deficiencies such as due to low gas loads, and
  c) anticipated stored gas loss for the design lifetime of the inflator, typically at least about 15 years or more.

Operation

The normal operation of the vehicle occupant safety assembly 10 is as follows:

Upon the sensing of a collision, an electrical signal is sent to the heat source 46. The heat source 46 functions and, when it is a pyrotechnic charge-containing initiator, discharges high temperature combustion products into the chamber 20 and the contents thereof, which include a stored compressed inert gas and a dissociative compensatory material which, in one embodiment, constitutes gaseous phase $N_2O$. The large heat addition results in thermal expansion of the stored inert gas and commencement of the thermal dissociation of the $N_2O$. In this thermal dissociation, the $N_2O$ begins to break down into smaller molecular fragments. As the $N_2O$ molecules fragment, the associated release of energy results in further heating of the remaining mixture. The increase both in temperature and the relative amount of gaseous products within the chamber 20 results in a rapid pressure rise within the chamber.

When the gas pressure within the chamber 20 exceeds the structural capability of the burst disc 36, the disc 36 ruptures or otherwise permits the passage of inflation gas, such as composed of the heated stored gas and the dissociation products resulting from dissociation of the compensatory material, through the diffuser assembly 30 and out the diffuser outlet openings 40 into the associated inflatable vehicle occupant restraint 12 such as to desirably result in the inflation thereof.

As will be appreciated, augmenting the inert stored gas with the products of dissociation, in addition to increasing the relative amount of gaseous material available for the purpose of inflating an associated inflatable vehicle occupant restraint, may additionally serve to further heat the stored gas. Such additional heating may desirably result in further volumetric expansion of the stored gas.

Inflator operation such as described above wherein the initial inflation gas normally released therefrom has been heated, relative to ambient temperature, is commonly referred to as "blowdown" operation, with the corresponding inflator assembly referred to as a "blowdown" inflator. It is to be understood, however, that the broader practice of the invention is not necessarily limited to such blowdown operation or such blowdown inflator assemblies. As described in greater detail below, other modes of operation as well as various inflator assembly constructions can desirably be used in the broader practice of the invention.

Figure 2B:
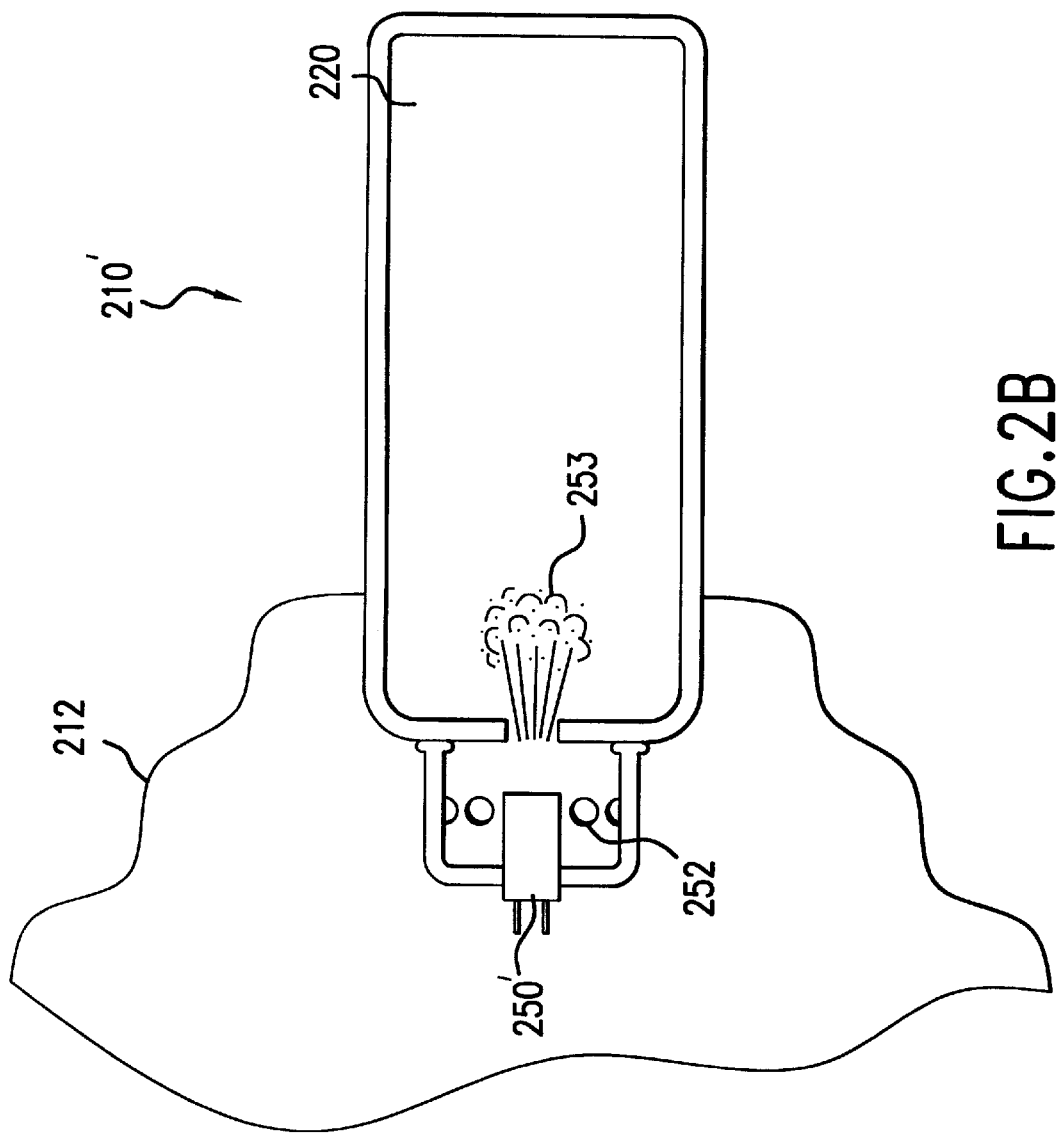

For example, FIG. 2A illustrates, in a static state, a vehicle occupant safety assembly 210 in accordance with another preferred embodiment of the invention. FIG. 2B illustrates the same vehicle occupant safety assembly, here designated by the reference 210', in a dynamic state or mode.

The vehicle occupant safety assembly 210 includes an inflatable vehicle occupant restraint 212, e.g., an inflatable airbag cushion, and an airbag inflator assembly 214 in accordance with another preferred embodiment of the invention. The inflator assembly 214, similar to the inflator assembly 14 described above, includes a pressure vessel 216 including a chamber 220 that contains, such as is known for stored gas compressed gas inflators and as described above, a compressed, typically inert gas and, in accordance with the invention, a quantity of a compensatory material. The chamber 220 is defined in part by an elongated generally cylindrical sleeve 222. The sleeve 222 may include a fill port (not shown), as is known in the art, wherethrough materials can be passed into the chamber 220.

The sleeve 222 has a first end 224 and a second end 226. The first end 224 is closed by means of a base wall 230. As will be appreciated, such a base wall 230 can be joined or otherwise attached to or with the sleeve 222 or formed integral, e.g., continuous and in one-piece, therewith.

The sleeve second end 226 is partially closed by a base wall 232. The base wall 232 includes an opening 234 therein, normally closed by means of a burst disc 236 or the like.

A diffuser assembly 240 is joined or attached to the base wall 232 in an appropriate manner, such as by an inertial weld 242. As will be appreciated, if desired or preferred, the diffluser assembly can be formed integral with the sleeve 222, i.e., formed continuous with and in one piece therewith.

The diffuser assembly 240 includes a base wall 244 having an opening 246 therein, wherethrough a heat source 250, such as described above, is appropriately attached. The diffuser assembly 240 also includes a plurality of outlet openings 252, wherethrough the inflation gas from the inflator assembly 214 is properly dispensed into the occupant restraint 212.

Such inflator assemblies, wherein the heat source 250 is housed outside the pressurized storage chamber 220, are sometimes referred to herein as having an "external" heater or heat source. In the specifically illustrated embodiment, the heat source 250 desirably functions to directly effect rupture or otherwise open the burst disc 236 as well as to heat the contents of the pressurized storage chamber 220, such as including stored compressed gas and dissociative compensatory material. The heat source 250', in accordance with the dynamic mode illustrated in FIG. 2B, desirably projects combustion products, designated by the reference numeral 253, into the storage chamber 220.

It will be appreciated that while some desired heat transfer to the contents of the pressurized storage chamber 220 can be realized as such contents pass in heat transfer communication though the diffuser assembly 240, in relatively proximity to the heat source 250, increased heat transfer communication can desirably be realized when the heat source projects such combustion products 253 into the storage chamber 220. The resulting inflation gas is passed or directed out the diffuser outlet openings 252 into the associated inflatable vehicle occupant restraint 212 such as to desirably result in the inflation thereof.

Operation

The normal operation of the vehicle occupant safety assembly 210 is as follows:

Upon the sensing of a collision, an electrical signal is sent to the heat source 250. The heat source 250 functions and, when it is a pyrotechnic charge-containing initiator, discharges high temperature combustion products 253 (as shown in FIG. 2B) at or towards the burst disc 236 and, desirably, into the chamber 220.

As a result of the discharge of the high temperature combustion products 253, the burst disc 236 opens, ruptures or otherwise permits the passage of the contents of the chamber 220 into the diffuser assembly 240. Further, through heat transfer communication between such high temperature combustion products discharge and the contents of the chamber 220, at least a quantity of the compensatory material undergoes dissociation.

Still further, the heat input from the heat source 250' and resulting from dissociation of the compensatory material results in thermal expansion of the stored inert gas. Consequently, inflation gas such as composed of the heated stored gas and the dissociation products resulting from dissociation of the compensatory material is passed or directed out the diffuser outlet openings 252 into the associated inflatable vehicle occupant restraint 212 such as to desirably result in the inflation thereof.

Figure 3:
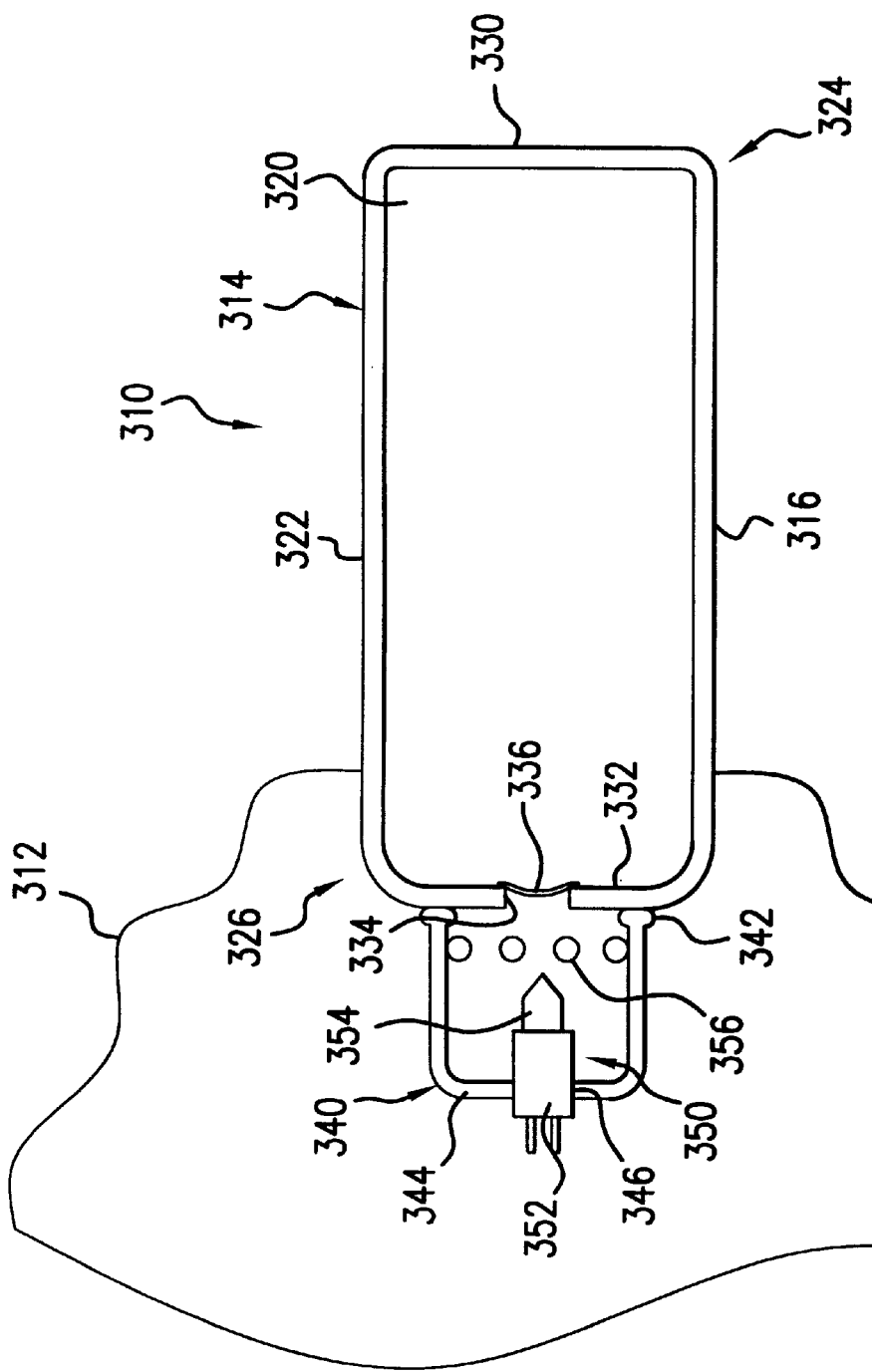
FIG. 3 is a simplified, partially in section, fragmentary schematic drawing of a vehicle occupant safety apparatus incorporating an airbag inflator assembly in accordance with yet another preferred embodiment of the invention.

Turning to FIG. 3, there is illustrated a vehicle occupant safety assembly, generally designated 310, which includes an inflatable vehicle occupant restraint 312, e.g., an inflatable airbag cushion, and an airbag inflator assembly 314 in accordance with another preferred embodiment of the invention. The airbag inflator assembly 314, similar to the airbag inflator assembly 210, described above, includes a pressure vessel 316 including a chamber 320 that contains, such as is known for stored gas compressed gas inflators and as described above, a compressed, typically inert gas and, in accordance with the invention, a quantity of a compensatory material.

The chamber 320 is defined in part by an elongated generally cylindrical sleeve 322, generally similar to the sleeve 222 described above. The sleeve 322 similarly includes a first end 324 and a second end 326, with the first end 324 closed by means of a base wall 330 and the sleeve second end 326 is partially closed by a base wall 332. The base wall 332 similarly includes an opening 334 therein, normally closed by means of a burst disc 336 or the like.

As with the inflator assembly 214, a diffuser assembly 340 is joined or attached to the base wall 332 in an appropriate manner, such as by an inertial weld 342.

The diffuser assembly 340 includes a base wall 344 having an opening 346 therein, wherethrough a heat source and projectile combination 350 is appropriately attached such as by a weld, crimp or other suitable form of joinder.

The heat source and projectile combination 350 includes a heat source 352 such as in the form of a squib, similar to the heat source 250 described above, and an associated projectile 354, the operation of which will be described in greater detail below.

The diffuser assembly 340 also includes a plurality of outlet openings 356, wherethrough the inflation gas from the inflator assembly 314 is properly dispensed into the occupant restraint 312.

Operation

The normal operation of the vehicle occupant safety assembly 310 is as follows:

Upon the sensing of a collision, an electrical signal is sent to the squib 352. The squib 352 fires and propels the projectile 354 into the burst disc 336 whereby the disc 336 ruptures, opens or otherwise permits the passage of stored contents of the chamber 320 through the base portion opening 334 and out of the chamber 320 into the diffuser assembly 340. In the diffuser assembly 340, contents from the chamber 320 come into contact with the squib heat source 352 such that at least a quantity of the compensatory material undergoes dissociation.

The heat input from the heat source 352 and resulting from dissociation of the compensatory material results in thermal expansion of the stored inert gas. Inflation gas such as composed of the heated stored gas and the dissociation products resulting from dissociation of the compensatory material are passed or directed out the diffuser outlet openings 356 into the associated inflatable vehicle occupant restraint 312.

Figure 4:
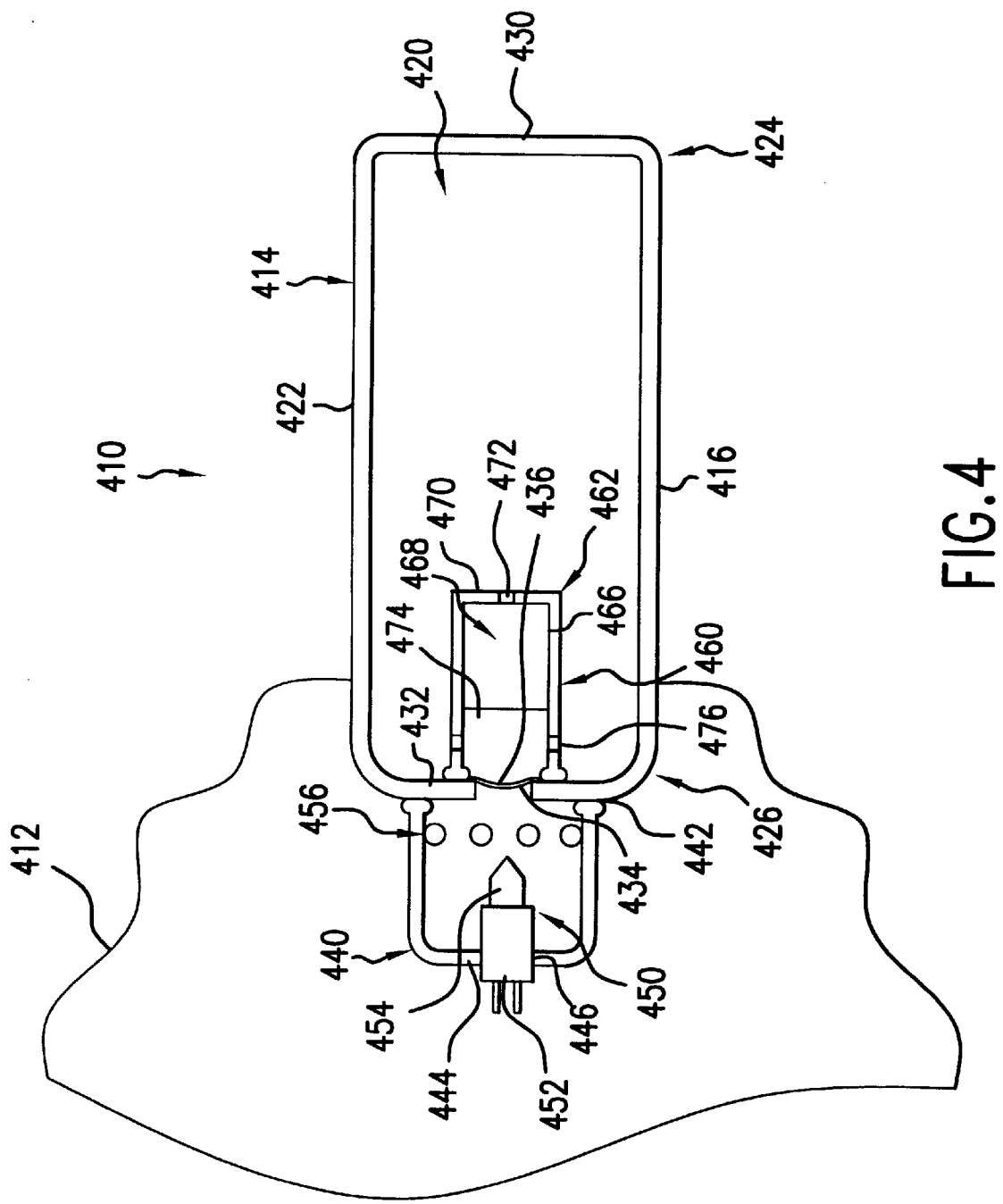
FIG. 4 is a simplified, partially in section, fragmentary schematic drawing of a vehicle occupant safety apparatus incorporating an airbag inflator assembly in accordance with still another preferred embodiment of the invention.

Turning to FIG. 4, there is illustrated a vehicle occupant safety assembly, generally designated 410, which includes an inflatable vehicle occupant restraint 412, e.g., an inflatable airbag cushion, and an airbag inflator assembly 414 in accordance with another preferred embodiment of the invention. The airbag inflator assembly 414, similar to the airbag inflator assembly 310, described above, includes a pressure vessel 416 including a chamber 420 that contains, such as is known for stored gas compressed gas inflators and as described above, a compressed, typically inert gas and, in accordance with the invention, a quantity of a compensatory material.

The chamber 420 is defined in part by an elongated generally cylindrical sleeve 422, generally similar to the sleeve 322 described above. The sleeve 422 similarly includes a first end 424 and a second end 426, with the first end 424 closed by means of a base wall 430 and the sleeve second end 426 partially closed by a base wall 432. The base wall 432 similarly includes an opening 434 therein, normally closed by means of a burst disc 436 or the like.

As with the inflator assembly 314, a diffuser assembly 440 is joined or attached to the base wall 432 in an appropriate manner, such as by an inertial weld 442.

The diffuser assembly 440 includes a base wall 444 having an opening 446 therein, wherethrough an initiator and projectile combination 450 is appropriately attached such as by a weld, crimp or other suitable form of joinder. The initiator and projectile combination 450 includes an initiator 452 such as in the form of a squib and an associated projectile 454, the operation of which will be described in greater detail below.

The diffuser assembly 440 also includes a plurality of outlet openings 456, wherethrough the inflation gas from the inflator assembly 414 is properly dispensed into the occupant restraint 412.

The vehicle occupant safety assembly 410 significantly differs from the assembly 310 described above, however, in the inclusion of an internal heater assembly, generally designated by the reference numeral 460, as described below. As will be appreciated, such an internal heater assembly may in accordance with the invention serve to function such as to heat the contents of the chamber vessel 420. In certain preferred embodiments, such an internal heater assembly may also advantageously additionally serve to provide added inflation medium for use in the inflation of the associated inflatable vehicle occupant restraint 412.

The internal heater assembly 460 includes a heater housing 462, such as in the form of a cup. The heater housing 462 desirably is joined, attached or otherwise properly secured within the chamber vessel 420, such as by means of a weld adjacent to the base wall opening 434. The heater housing 462 includes a storage volume 466 such as contains a quantity of a selected heat producing material 468. For example, such a heat producing material may take the form of a pyrotechnic, a monopropellant, or a combustible combination of fuel and oxidant, such as are known in the art. Fuel materials storable within such a heater storage volume 466 may, in accordance with the invention, take various forms including the forms of solids, fluids such as liquids, gases and finely divided solids as well as multi phase combinations thereof, for example.

In general, heat producing materials for use in the practice of the invention will, upon actuation or initiation, react to produce reaction products including heat. As will be appreciated, dependent on the particular material used, such reaction products may also include at least some gaseous products such as may be added to or supplement the contents of the chamber 420.

The internal heater assembly housing 462 includes an end portion 470 that forms or includes a central outlet opening or nozzle orifice 472 wherethrough combustion products such as resulting from the material stored with the internal heater storage volume 466 can be passed or otherwise released into communication with the contents of the chamber vessel 420. It will be understood, however, that the number, positioning and shape of such nozzle orifice or orifices can be appropriately altered to satisfy design requirements for particular installations as will be apparent to those skilled in the art.

As will be appreciated, the FIG. 4 depiction of the vehicle occupant safety assembly 410 has been simplified to facilitate illustration and comprehension such as by not showing certain common initiation or actuation elements, mechanisms and the like such as may be desired or required to effect firing and combustion of such stored fuel material and such as do not generally limit the broader practice of the invention. For example, the internal heater assembly may include either as a part or in association with the fuel storage volume elements such as a striker plate and one or more loads of primer material such that contact by the projectile results in combustion of the respectively stored material, e.g., pyrotechnic, monopropellant, or combustible combination of fuel and oxidant.

The heater housing 462 also includes an outlet volume 474 which in combination with outlet ports 476 present in the heater housing 462 permits the contents of the chamber vessel 420 to communicate, via the opening 434, with the diffuser assembly 440 and, in turn the associated inflatable vehicle occupant restraint 412.

Operation

The normal operation of the vehicle occupant safety assembly 410 is as follows:

Upon the sensing of a collision, an electrical signal is sent to the initiator 452. The initiator 452 fires and propels the projectile 454 into the burst disc 436. The disc 436 ruptures or otherwise initially permits the passage of an initial portion of the stored contents of the chamber 420 through the base wall opening 434, such as via the heater housing outlet ports 476 and the outlet volume 474, and subsequently through the diffuser assembly 440 and the outlet openings 456, into the associated occupant restraint 412 to at least begin effecting the deployment or inflation thereof.

The projectile 454, in turn, advances to result in initiation or actuation of reaction of the heat producing material 468 such as in a manner known in the art, such as described above. As described above, such reaction serves to produce reaction products including heat and, dependent on the particular material selected and the reaction thereof, additional gaseous products. The heat and, if produced, additional gaseous products produced or formed upon reaction of the heat producing material 468 of the internal heater assembly housing 462 communicate with the remaining stored contents of the chamber 420 via the outlet opening 472.

As a result of such contact and communication, at least a quantity of the compensatory material remaining with the chamber 420 undergoes dissociation. The heat input from the internal heater assembly 460 and resulting from dissociation of the compensatory material results in thermal expansion of the stored inert gas. Inflation gas such as composed of the heated stored gas and the dissociation products resulting from dissociation of the compensatory material is passed or directed out the chamber 420 through the outlet ports 476 to the outlet volume 474. Such inflation gas is then passed through the base wall opening 434 into the diffuser assembly 440 and subsequently through the outlet openings 456, into the associated occupant restraint 412 to effect the further deployment or inflation thereof.

As will be appreciated, the initial release of a portion of the stored contents of the chamber 420 prior to the realization of significant or substantial heat addition via the output of the internal heater assembly 460 may generally permit a more gradual or less aggressive initial deployment of the associated inflatable vehicle occupant restraint 412. As will be appreciated, a restraint system providing such more gradual or less aggressive initial deployment may be particularly suited for in conjunction with such newer or more advance detection or sensor system that provide a greater or increased lead time to impact by the vehicle and thus the need for deployed restraint.

The present invention is described in further detail in connection with the following examples which either or both illustrate or simulate various aspects involved in the practice of the invention. It is to be understood that all changes that come within the spirit of the invention are desired to be protected and thus the invention is not to be construed as limited by these examples.

EXAMPLES

A series of tests were performed utilizing inflator devices in accordance with the invention (containing the compensatory material nitrous oxide) and standard inert gas-based inflator devices to study and compare the effects of leaks in such devices.

EXAMPLES (EX.) 1–5 and COMPARATIVE EXAMPLES (CE) 1–5

Ten geometrically identical test inflators were constructed. Each inflator featured a 460-mg THPP (titanium hydride potassium perchlorate) based initiator. The internal volume of each of the inflators was 57.4 cc, and each featured two exhaust orifices measuring 0.47 cm in diameter. Five of the test inflators (Comparative Examples 1–5) were filled with a mixture of 90% argon and 10% helium (molar basis) in loads of 24, 22, 19, 14 and 8 grams, respectively. The other five inflators (Examples 1–5) were filled with identical mass loads of a compressed gas mixture which in addition to containing 70 mole percent argon and 10 mole percent helium, also contained 20 mole percent of nitrous oxide, in accordance with the invention.

The principal objective of these tests was to study how the mass of gas affected inflator performance with and without the inclusion of a compensatory material in accordance with the invention. More specifically, the low load tests were intended to simulate a leak down condition with performance parameters of interest including tank (pressure) and the molar (volumetric) output from the inflators.

Figure 5:
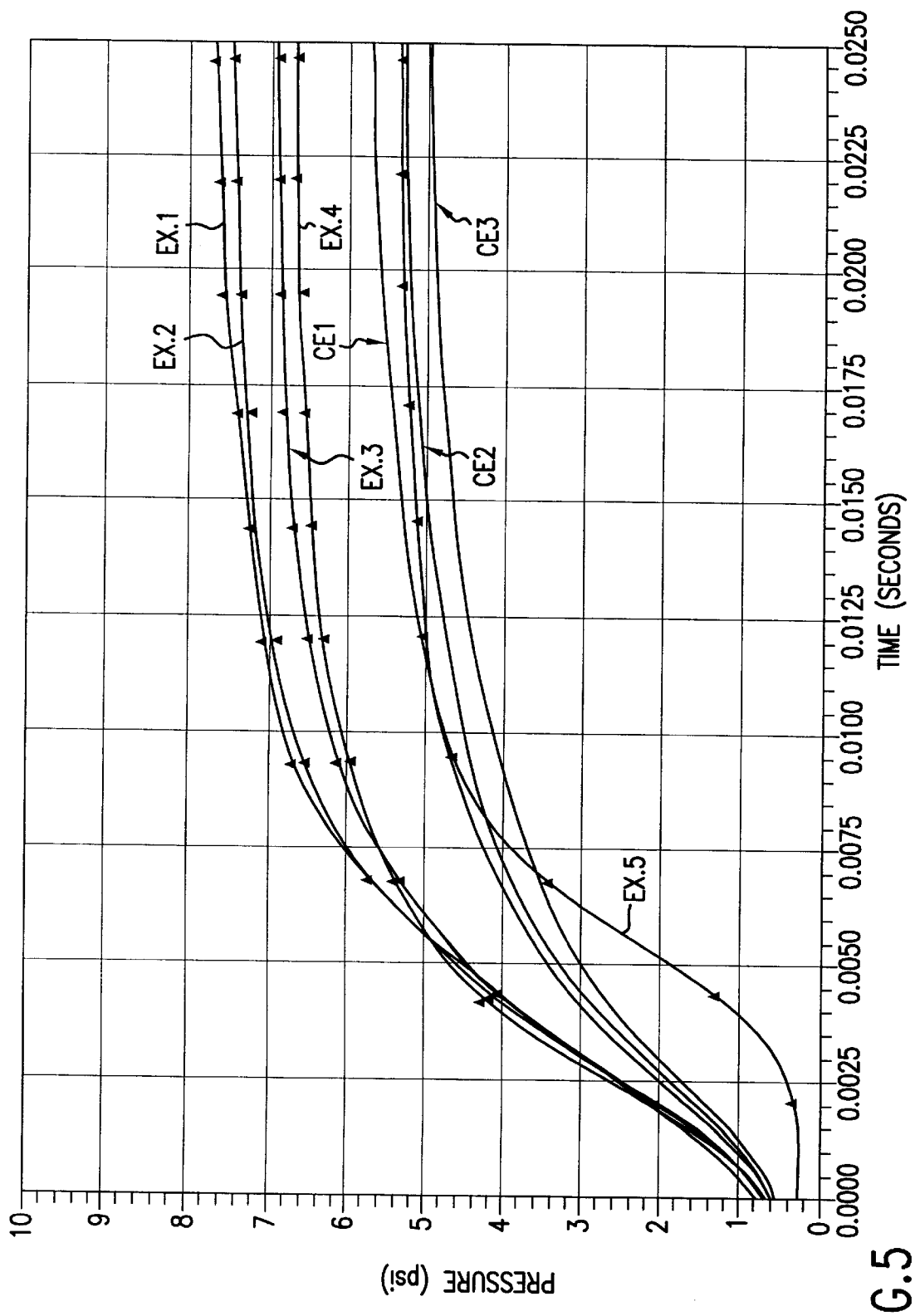
FIG. 5 is a graphical depiction of tank pressure as a function of time performance realized in the test tank for Comparative Examples 1–5 and Examples 1–5.

Results from these tests are shown in TABLE 1, below, and in FIG. 5. In TABLE 1, F/I MOLE RATIO is the ratio of the initial number of moles of stored material to the number of moles of final products. In FIG. 5, pressure (as measured in a 60-liter test tank) was plotted as a function of time. Based on an analysis of the respective effluent gases, it was possible to calculate the corresponding nitrous oxide dissociation efficiency (DIS. EFF.) for each test, as shown in TABLE 1, below.

TABLE 1

| TEST | LOAD (g) | $P_{max}$ (psig) | F/I MOLE RATIO | DIS. EFF. (%) |
|---|---|---|---|---|
| EX. 1 | 24 | 7.7 | 1.020 | 20.4 |
| EX. 2 | 22 | 7.4 | 1.024 | 24.2 |
| EX. 3 | 19 | 6.9 | 1.026 | 25.5 |
| EX. 4 | 14 | 6.6 | 1.037 | 37.3 |
| EX. 5 | 8 | 5.3 | 1.077 | 77.1 |
| CE 1 | 24 | 5.8 | 1 | 0 |
| CE 2 | 22 | 5.4 | 1 | 0 |
| CE 3 | 19 | 5.1 | 1 | 0 |
| CE 4 | 14 | 0 | 1 | 0 |
| CE 5 | 8 | 0 | 1 | 0 |

DISCUSSION OF RESULTS

The results clearly show the realization of increased performance benefit via the inclusion of nitrous oxide, particularly as the gas load level was decreased. Note that, when considering the entire inert gas-based system (90/10 Ar/He), the tank pressure progressively decreased as load was decreased from 24 to 22 and then 19 grams (see TABLE 1 results for CE 1, CE 2 and CE 3, respectively). In fact, no pressure was recorded for the 14 and 8 gram load tests (see TABLE 1 results for CE 4 and CE 5, respectively). This was attributable to the inflator performance being insufficient to effect rupture the internal burst disc within the inflator and, consequently, no gas was permitted to flow into the test tank. Thus, for an entirely inert gas-based system, a 10-gram reduction in load was sufficiently severe that the inflator failed to discharge gas into the tank. On the other hand, the inflator devices in accordance with the invention (containing the compensatory material nitrous oxide) were seen to function even given a 16-gram gas load reduction from the inflator. Such performance supports the positions that inflator devices in accordance with the invention are generally less sensitive to the effects of leakages, particularly relatively large leakages of stored gas from the inflator device.

It is also noted that for the same initial mass of 24-grams, the maximum tank pressure produced by the inflator device in accordance containing the compensatory material nitrous oxide was significantly higher than that produced or realized by the entirely inert gas-based system. This is believed due or attributable to the additional energy released by exothermic dissociation of a fraction of the stored nitrous oxide load.

In addition, these tests results showed that the amount of nitrous oxide dissociation progressively increased as the initial load of the nitrous oxide-bearing gas decreased. This is attributable to the fact that, as the load decreased, less gas was present to be heated by the initiator. Therefore, at such lower loads, the nitrous oxide-bearing gas is believed to be heated more uniformly and thoroughly to the dissociation temperature, thus increasing the efficiency of the nitrous oxide dissociation.

Also, the reduction in molar output from the test inflator devices with decreased gas load was slightly less for the test inflator devices in accordance with the invention (containing the compensatory material nitrous oxide) as compared to the similar inflator device containing solely inert gas. This is also believed attributable to the increased dissociation efficiency of the compensatory material, i.e., nitrous oxide, with reduced gas load. As will be appreciated, the dissociation of nitrous oxide into oxygen and nitrogen creates additional moles of gas. Thus, the greater the dissociation efficiency, the greater the relative molar gas production.

COMPARATIVE EXAMPLE 6

A typical side impact inflator (envelope of 25 mm diameter by 210 mm length) was initially filled with 25.6 grams of a gaseous composition which was 90 volume percent argon and 10 volume percent helium.

Upon actuation and discharge into a one cubic foot tank, such an inflator will produce a tank pressure of about 95 kPa. Therefore, in order to satisfy the long-term design specification or requirement that, after the elapsing of 15 years, the inflator is able to produce a tank pressure of at least about 90% of the tank pressure value obtainable when the inflator device was in an original or new condition or state, such an inflator need be able to produce a tank pressure of at least about 85.5 kPa in such a one cubic foot tank after the passage of such time interval.

Analysis shows that such tank pressure performance can be achieved by such an inflator containing a 23-gram load of a 90 volume percent argon/10 volume percent helium gas composition. Thus, assuming the loss of content components in proportional amounts, this inflator can lose only 2.6 grams of the 90/10 argon/helium mix over the course of fifteen years and still satisfy such a long-term design specification. Assuming such loss occurs equally over the specified time period, such loss rate corresponds to a leak rate of about $5 \times 10^{-7}$ cc atm/s. In typical or usual production environments, such a low leak rate is generally difficult to measure and is near the accuracy limitations of commonly used instrumentation.

EXAMPLE 6

A similarly sized side impact inflator (envelope of 25 mm diameter by 210 mm length) was initially filled with the same initial mass (25.6 grams) of a composition, this time in accordance with the invention. Specifically, the composition employed was 30 volume percent nitrous oxide, 60 volume percent argon and 10 volume percent helium.

Upon actuation and discharge into a one cubic foot tank, such an inflator will produce a tank pressure of about 115 kPa. Therefore, in order to satisfy the long-term design specification or requirement that, after the elapsing of 15 years, the inflator be able to produce a tank pressure of at least about 90% of the tank pressure value obtainable when the inflator device was in an original or new condition or state, such an inflator need be able to produce a tank pressure of at least about 103.5 kPa in such a one cubic foot tank after the passage of such time interval.

Analysis shows that such tank pressure performance can be achieved by such an inflator containing a 19.3 gram load of a 30 volume percent nitrous oxide, 60 volume percent argon and 10 volume percent helium composition. Thus, assuming the loss of content components in proportional amounts, this inflator can lose up to about 6.3 grams of the 30/60/10 nitrous/argon/helium mix over the course of fifteen years and still satisfy such a long-term design specification. Assuming such loss occurs equally over the specified time period, such loss rate corresponds to a leak rate of about $1.1 \times 10^{-6}$ cc atm/s. Such a leak rate is about double that identified above in Comparative Example 6. As will be appreciated, such significantly higher leak rate is generally much easier and more accurately measured in usual production or manufacturing environments.

In view of the above, it will be appreciated that the invention can advantageously provide an improved compressed gas-containing inflator design and associated methods. In particular, the invention can provide such an inflator design and method wherein the criticality of at least one or more design parameter associated therewith, such as relating to the load tolerance, the leak rate tolerance and combinations thereof can be minimized, reduced or avoided in a manner or to an extent not previously readily realized with prior inflator designs and methods. Further, the invention can advantageously provide a pressurized inflator design having improved reliability and simplified manufacture and production as compared with typical prior inflator designs.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. An apparatus for inflating an inflatable device, said apparatus comprising:
   a first chamber having contents consisting essentially of inert stored pressurized gas and at least about 5 mole percent to no more than about 95 mole percent of a material of a first molar content and which material, when initiated, undergoes dissociation to form dissociation products having a molar content, where the second molar content is greater than the first molar content, and
   a heat source actuatable to be in heat transmitting communication with the contents of said first chamber to heat the contents and to initiate dissociation of at least a portion of the material of a first molar content to form dissociation products of the second molar content.

2. The apparatus of claim 1 wherein the material of a first molar content is nitrous oxide.

3. The apparatus of claim 1 wherein the material of a first molar content is acetylene.

4. The apparatus of claim 1 wherein said heat source is internally situated relative to said first chamber.

5. The apparatus of claim 1 wherein said heat source is externally situated relative to said first chamber.

6. The apparatus of claim 5 wherein said externally situated heat source is a part of a heat source and projectile combination which comprises a projectile to mechanically effect opening of said first chamber upon actuation.

7. The apparatus of claim 1 wherein said first chamber comprises a rupturable wall segment.

8. The apparatus of claim 7 wherein said rupturable wall segment includes an opening to permit passage out of said chamber of at least a portion of the contents thereof and a burst disc normally preventing passage through said opening.

9. The apparatus of claim 1 wherein the material of a first molar content is present in said chamber in an amount of at least about 10 mole percent and no more than about 90 mole percent.

10. The apparatus of claim 9 wherein the material of a first molar content is present in said chamber in an amount of at least about 20 mole percent and no more than about 70 mole percent.

11. An apparatus for inflating an inflatable device, said apparatus comprising:
    a first chamber having contents consisting essentially of inert stored pressurized gas and at least about 5 mole percent to no more than about 95 mole percent of nitrous oxide, and
    a heat source actuatable to be in heat transmitting communication with the contents of said first chamber to heat the contents and to initiate dissociation of at least a portion of the nitrous oxide to form $N_2$ and $O_2$.

12. The apparatus of claim 11 wherein said heat source is internally situated relative to said first chamber.

13. The apparatus of claim 11 wherein said heat source is externally situated relative to said first chamber.

14. The apparatus of claim 13 wherein said externally situated heat source is a part of a heat source and projectile combination which comprises a projectile to mechanically effect opening of said first chamber upon actuation.

15. The apparatus of claim 11 wherein said first chamber comprises a rupturable wall segment.

16. The apparatus of claim 15 wherein said rupturable wall segment includes an opening to permit passage out of said chamber of at least a portion of the contents thereof and a burst disc normally preventing passage through said opening.

17. The apparatus of claim 11 wherein the nitrous oxide is present in said chamber in an amount of at least about 10 mole percent and no more than about 90 mole percent.

18. The apparatus of claim 17 wherein the nitrous oxide is present in said chamber in an amount of at least about 20 mole percent and no more than about 70 mole percent.

* * * * *